Jan. 30, 1923. 1,443,749
L. E. KNERR.
LUMBER CARRYING VEHICLE.
FILED FEB. 17, 1922.
2 SHEETS-SHEET 1

INVENTOR:
Lewis E. Knerr
BY
ATTORNEY

Jan. 30, 1923.

L. E. KNERR.
LUMBER CARRYING VEHICLE.
FILED FEB. 17, 1922.

1,443,749

2 SHEETS-SHEET 2

INVENTOR:
Lewis E. Knerr
BY
Pierre Barnes
ATTORNEY

Patented Jan. 30, 1923.

1,443,749

UNITED STATES PATENT OFFICE.

LEWIS E. KNERR, OF SEATTLE, WASHINGTON.

LUMBER-CARRYING VEHICLE.

Application filed February 17, 1922. Serial No. 537,194.

*To all whom it may concern:*

Be it known that I, LEWIS E. KNERR, a citizen of the United States, residing at Seattle, in the county of King and State of Washington, have invented certain new and useful Improvements in Lumber-Carrying Vehicles, of which the following is a specification.

This invention relates to vehicles for the transportation of lumber or the like.

An object of the invention is the provision of a vehicle of this character constructed preferably for use as a trailer with respect to a tractor or other vehicle which may be propelled or drawn by any suitable or well known means.

Another object of the invention is the provision of a vehicle adapted to be introduced below a load and having conveniently operated an efficient means for elevating the same into position to be carried by the vehicle.

Other objects and advantages of the invention will appear in the following description.

The invention is illustrated in the accompanying drawings, wherein,—

Figure 1:
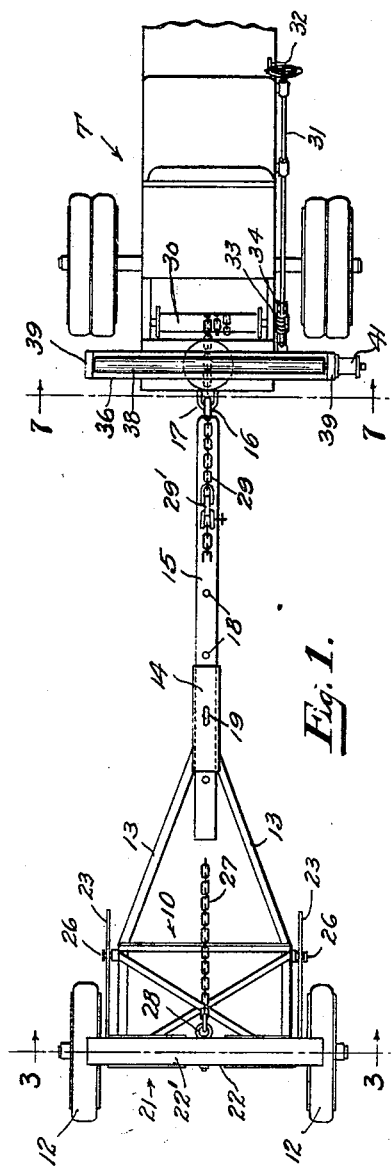
Figure 2:
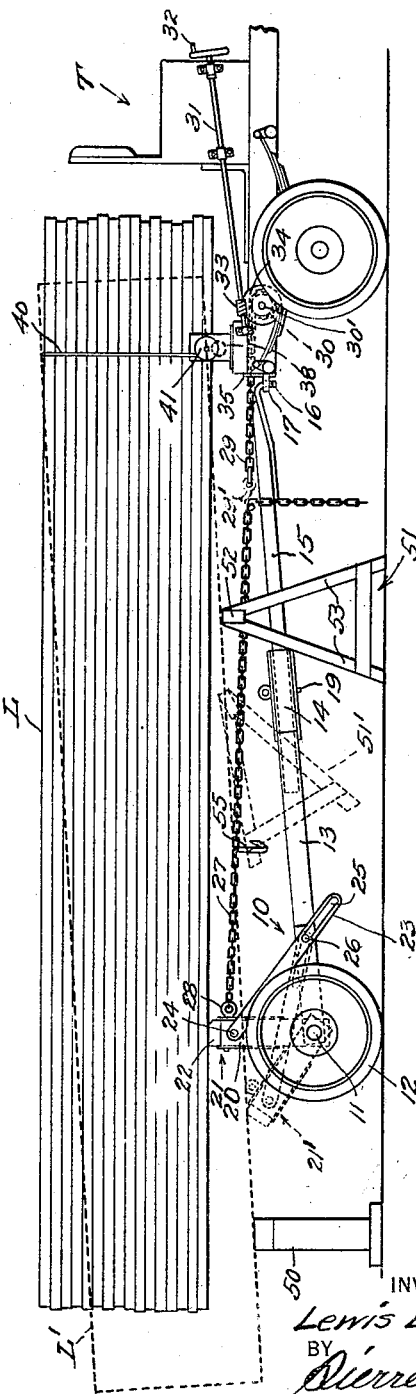
Figure 3:
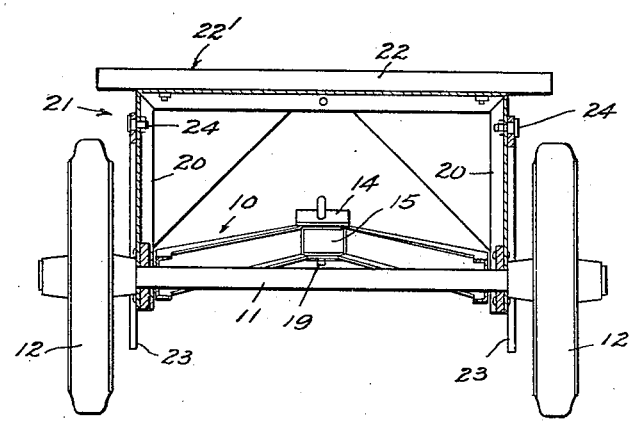
Figures 4, 5, 6:
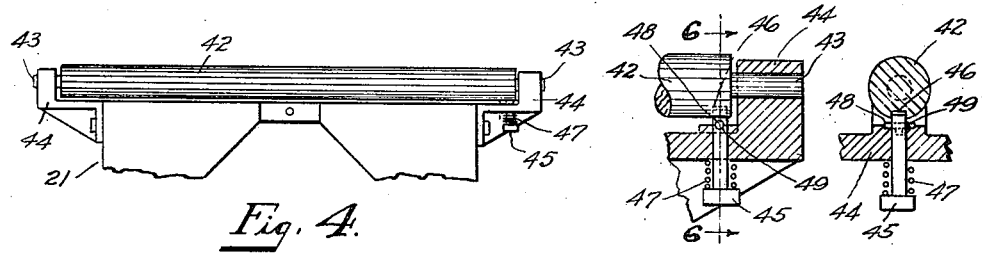
Figures 7, 8:
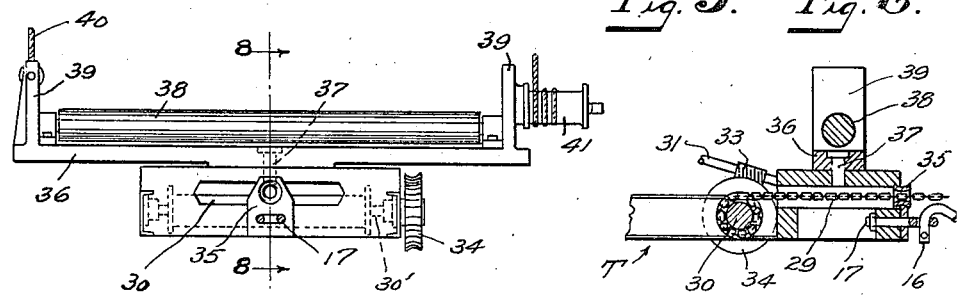

Figure 1 is a plan view of devices embodying my invention with parts omitted. Fig. 2 is a side elevation of the same shown applied to carrying a load. Fig. 3 is a rear elevation of the trailer shown in Figs. 1 and 2. Fig. 4 is a fragmentary rear elevational view to illustrate a modified construction of the rear bolster. Fig. 5 is a detail rear elevational view of a portion of the bolster illustrated in Fig. 4, and of the support therefor shown in vertical transverse section. Fig. 6 is a sectional view taken substantially through 6—6 of Fig. 5. Fig. 7 is a rear elevational view of a tractor provided with equipment which is utilized for carrying out the invention. Fig. 8 is a sectional view through 8—8 of Fig. 7.

In carrying out my invention I provide a truck having at its rear end framework 10 which is secured to and supported upon an axle 11 having journal bearings for ground wheels 12. Said framework includes hound pieces 13 and at their forward ends a sleeve member 14 to receive a reach bar 15.

This reach bar is provided at its forward end with a pintle 16 engageable in an apertured draw bar 17 extending from the rear end of a tractor which is indicated generally by T. For the purpose of regulating the position of the truck framework with respect to said tractor, the reach bar 15 is provided with a series of longitudinally spaced holes 18 which are designed to be used selectively to accomomdate a pin 19 which is employed in axially aligned holes in sleeve 14 to lock the reach bar in adjusted positions to said framework.

Pivotally connected to said frame work or, as shown, to the axle 11 are the side or post members 20 of an oscillatory frame 21 carrying a transversely arranged bolster 22 which, as shown in Figs. 1, 2 and 3, is rigid with frame 21 and has a plane upper surface $22^1$ disposed at right angles, or nearly so, to a plane extending axially through the frame posts.

23 represent bars pivotally connected as at 24 to the respective sides of the oscillatory frame 21, each of said bars being provided with a slot 25 to receive a stud 26 protruding from the framework 10 to limit the tilting movements of the frame 21.

27 represents a chain, or an equivalent, having one end secured as by means of an eye-bolt 28 to the upper portion of said oscillatory frame for drawing the latter forwardly from its dotted line position $21^1$ in Fig. 2 to its full line position in such view. The chain 27 is actuated to draw said oscillatory frame into its elevated or load supporting position by means of a supplementary chain 29 adjustably connected to the chain 27 as by means of a hook $29^1$, said supplementary chain extending about the winding drum 30 of a windlass provided upon the tractor T.

Said drum may be rotated by power devices or, as shown, by manually operated means as, for example, a shaft 31 provided with a crank 32 and a worm 33 engaging a worm wheel 34 which is mounted upon the drum shaft $30^1$. In order to maintain the chain connection in a substantially taut condition, as when the tractor and vehicle are travelling about a curve, the chain is led through an apertured guide plate 35 provided on the tractor at about the midwidth of the same and in proximity with the pintle connection between the tractor and the trailer.

36 represents a frame supported upon the tractor deck or platform and pivotally connected intermediate its length thereto as by means of a swivel pin 37.

The frame 36 carries a horizontally disposed roller 38 which constitutes a bolster to support the front end of a load L, of lumber or the like. The frame 36 is desirably provided at its opposite ends with stanchion elements 39 to prevent the load from becoming displaced laterally from the bolster roller 38. 40 represents a cable or chain having one end thereof secured to one of the stanchions 39 and is designed to extend over the load and have its other end connected to a hand operated winch 41 whereby the load is held down firmly upon the roller 38.

In the modified construction illustrated in Figs. 4, 5 and 6, I show a roller 42 to serve in lieu of the bolster 22 hereinbefore described.

According to the modified construction, the roller 42 is provided with axle ends 43 journaled in bracket pieces 44 which are rigid or formed integral with the aforesaid oscillatory frame 21.

The function of the roller 42 is to afford convenient means for removing the load over the rear end of the trailer instead of being deposited upon trestles as will be presently described.

When in transit, however, the roller 42 is secured from rotating, as by means of a lock bolt 45 (see Figs. 5 and 6) which is engageable in a socket 46 provided therefor in the roller. When the roller is employed for unloading purposes, said lock bolt is adapted to be held out of engagement with the roller by means of a spring 47 and at other times is held in engaged relations with the roller as by means of a key pin 48 inserted through a hole in the bolt 45 and within a recess 49 provided therefor in the adjacent bracket 44.

A stack of lumber, for example, which is to be conveyed by my improved vehicle is primarily placed in a position substantially as indicated by broken lines $L^1$ in Fig. 2, upon a pair of trestles 50—51. The trestle 50 may be stationary, but the other trestle, 51, is portable and is comprised of a horizontal bar member 52 rigidly connected to and supported at each of its ends by leg members, such as 53. The leg members of the trestle are, moreover, spaced apart and of heights to afford space therebetween to enable the trailer to be backed therethrough to occupy a position under the load. With the trailer thus disposed and with the tractor arranged to have the roller 38 beneath the forward portion of the load, and the oscillatory frame in its dotted line $21^1$ position, the operator actuates the drum 30 to cause the chain 29 to be wound thereupon, resulting in the oscillatory frame being drawn forwardly and upwardly into its full line position, Fig. 2.

The binding cable or chain 40 is then employed over the load to secure the forward end of the latter upon the roller 38. The trestle 51 is then swung upwardly and secured as by means of a hook attachment 55 in the position in which it is indicated by dotted lines $51^1$ in Fig. 2, to be carried with the vehicle to the place of unloading.

For unloading, a trestle occupying the same relative position with respect to the vehicle and load, as that in which the trestle 50 is shown in Fig. 2, is desirably used cooperatively with the transported trestle 51 to receive the load which is deposited thereon by unwinding the chain from the drum 30.

In unwinding the chain the oscillatory frame 21 is swung rearwardly into its lowermost position to permit the same passing through the space between the legs of trestle 51 when the trailer is drawn forwardly by the tractor or otherwise.

The rearmost trestle 50 at both the loading and unloading positions is advantageously of less height than the complementary trestle 51 in order that when upon the trestles the load will be held in an inclined position longitudinally thereof and cause no interference of the load with the vehicle when being removed from under a load.

What I claim, is,—

1. A lumber carrying trailer comprising a wheel supported axle, framework rigid with said axle and including a sleeve element, a reach-bar extending through said sleeve, means engageable with sleeve for securing the reach-bar thereto in adjusted positions with respect to said framework, a bolster, a supporting frame therefor, said frame being pivotally connected to said axle for oscillatory movements, a draw chain connected to said frame, and means operating through the medium of said chain for swinging said frame to cause the bolster thereon to be brought into its lumber supporting position.

2. A lumber carrying trailer comprising a wheel supported axle, framework rigid with said axle and including a sleeve element, a reach-bar extending through said sleeve means engageable with sleeve for securing the reach-bar thereto in adjusted positions with respect to said framework, a bolster, a supporting frame therefor, said frame being pivotally connected to said axle for oscillatory movements, slotted bars pivotally connected to said frame, studs provided on said framework and engaging in the slots of the respective bars for limiting the oscillatory movements of said frame, a draw chain connected to said frame, and means operating through the medium of said chain for swinging said frame to cause the bolster thereon to be brought into its lumber supporting position.

3. A lumber carrying trailer comprising a wheel supported axle, framework connected thereto, a reach-bar, a bolster, a supporting frame therefor pivotally connected to said axle for oscillatory movements, means connecting said framework with the frame for limiting the oscillatory movements thereof, and means connected with said frame for swinging the latter for elevating into and releasably holding the bolster in its lumber supporting position.

4. A lumber carrying trailer comprising a wheel supported axle, framework connected thereto, a reach-bar, means to secure the reach-bar in adjusted positions to said framework, a bolster, a supporting frame therefor pivotally connected to said axle for oscillatory movements, means connecting said framework with the frame for limiting the oscillatory movements thereof, and means connected with said frame for swinging the latter for elevating into and releasably holding the bolster in its lumber supporting position.

5. In a lumber carrying trailer, the combination of a wheel supported axle, framework connected thereto, a reach-bar, means to secure said reach-bar in adjusted positions to said framework, a rigid frame pivotally connected to said axle for oscillatory movements with respect thereto, a bolster mounted for rotation upon said frame, means for releasably securing said bolster from rotating, and means for regulating the oscillatory position of said frame to carry the bolster into or from its lumber supporting positions selectively.

6. In apparatus of the character described, the combination with a tractor, a bolster mounted upon the tractor, and a winding drum provided on said tractor, of a two-wheel trailer having a reach-bar, pivotal connection between said reach-bar and the tractor, a second bolster, a frame supporting the latter and connected for oscillatory movements to the trailer, and a draw-chain connected to said frame and engageable with said drum, means for rotating said drum to wind said chain thereabout for elevating the second named bolster into cooperative relations with the first named bolster for supporting a load of lumber upon both the tractor and trailer.

7. In apparatus of the character described, the combination with a tractor, a rotary bolster mounted upon the tractor, and a winding drum provided on said tractor, of a two-wheel trailer having a reach-bar, pivotal connection between said reach-bar and the tractor, a second bolster, a frame supporting the latter and connected for oscillatory movements to the trailer, and a draw-chain connected to said frame and engageable with said drum, means for rotating said drum to wind said chain thereabout for elevating the second named bolster into cooperative relations with the first named bolster for supporting a load of lumber upon both the tractor and trailer.

8. In apparatus of the character described, the combination with a tractor, a rotary bolster mounted upon the tractor and having a swivel connection therewith, and a winding drum provided on said tractor, of a two-wheel trailer having a reach-bar, pivotal connection between said reach-bar and the tractor, a second bolster, a frame supporting the latter and connected for oscillatory movements to the trailer, a draw-chain connected to said frame and engageable with said drum, means for rotating said drum to wind said chain thereabout for elevating the second named bolster into cooperative relations with the first named bolster for supporting a load of lumber upon both the tractor and trailer, means provided upon the tractor at opposite ends of the first named bolster to prevent the lateral displacement of the load therefrom, and flexible means connected to the aforesaid means and arranged to extend over a load to secure the same upon the first named bolster and to the tractor.

9. In apparatus of the character described, the combination with a tractor, a rotary bolster mounted upon the tractor and having a swivel connection therewith, and a winding drum provided on said tractor, of a two-wheel trailer having a reach-bar, pivotal connection between said reach-bar and the tractor, a second bolster, a frame supporting the latter and connected for oscillatory movements to the trailer, a draw-chain connected to said frame and engageable with said drum, means for rotating said drum to wind said chain thereabout for elevating the second named bolster into cooperative relations with the first named bolster for supporting a load of lumber upon both the tractor and trailer, and means provided upon the tractor at opposite ends of the first named bolster to prevent the lateral displacement of the load therefrom.

10. In apparatus of the character described, the combination with a tractor, a rotary bolster mounted upon the tractor and having a swivel connection therewith, a winding drum provided on said tractor, of a two-wheel trailer having a reach-bar, pivotal connection between said reach-bar and the tractor, a second bolster, a frame supporting the latter and connected for oscillatory movements to the trailer, a draw-chain connected to said frame and engageable with said drum, means for rotating said drum to wind said chain thereabout for elevating the second named bolster into cooperative relations with the first named bolster for supporting a load of lumber upon both the tractor and trailer, means provided upon the tractor at opposite ends of the first named bolster to prevent the lateral displacement of the load therefrom, and chain guiding means located in proximity of the pivotal connection between the tractor and trailer to maintain the chain in substantially parallelism with the reach-bar when a load is being conveyed upon both of the vehicles.

Signed at Seattle, Washington, this 10th day of February, 1922.

LEWIS E. KNERR.

Witnesses:
PIERRE BARNES,
MARGARET G. SUPPLE.